United States Patent [19]

Hekal

[11] Patent Number: 4,536,425

[45] Date of Patent: Aug. 20, 1985

[54] METHOD FOR PREPARING POLAR THERMOPLASTIC RESIN COMPOSITIONS HAVING IMPROVED GAS BARRIER PROPERTIES

[75] Inventor: Ihab M. Hekal, Stamford, Conn.

[73] Assignee: Continental Can Company, Stamford, Conn.

[21] Appl. No.: 618,699

[22] Filed: Jun. 8, 1984

[51] Int. Cl.$^3$ .................. B65D 81/00; C08L 67/02
[52] U.S. Cl. ........................ 428/35; 525/119; 525/342; 525/423; 525/431; 525/438; 525/446; 525/463; 525/464
[58] Field of Search ............... 523/440, 443; 524/492, 524/493, 605; 525/446, 438, 119, 342, 423, 431, 463, 464; 428/35; 264/328.1, 319

[56] References Cited

U.S. PATENT DOCUMENTS

| | | | |
|---|---|---|---|
| 3,036,023 | 5/1962 | Rogers, Jr. et al. | 260/2.5 |
| 3,464,854 | 9/1969 | Bolger | 523/443 |
| 3,515,626 | 6/1970 | Duffield | 524/493 |
| 4,405,727 | 9/1983 | Brownscombe | 524/450 |

*Primary Examiner*—Theodore E. Pertilla
*Attorney, Agent, or Firm*—Paul Shapiro

[57] ABSTRACT

A method of preparing a polar thermoplastic resin having improved resistance to gas permeability is disclosed wherein a blend of the resin and coarse mica flakes having an average particle size of less than about 100 mesh is prepared, the blend being prepared under mixing conditions which impart a shear force to the mica flakes sufficient to delaminate the flakes into individual platelets, substantially increasing the original aspect ratio of the flakes whereby an increase in the gas barrier properties of the resin is attained greater than that attained with fine mica flakes having an average particle size greater than about 100 mesh.

27 Claims, No Drawings

METHOD FOR PREPARING POLAR THERMOPLASTIC RESIN COMPOSITIONS HAVING IMPROVED GAS BARRIER PROPERTIES

BACKGROUND OF THE INVENTION

1. Field of the Invention

This invention relates to polar thermoplastic resins having improved gas barrier properties and more particularly to a method for preparing polar thermoplastic resins filled with mica flakes having improved gas barrier properties.

2. The Prior Art

Heretofore, polar thermoplastic resins such as polyethylene terephthalate have been used as packaging materials for carbonated beverages, pharmaceutical products, cosmetic articles and other products, but because of their relatively high permeability to gases such as oxygen, their use has not been extended to packaging oxygen-sensitive food products to be stored at unrefrigerated or ambient temperatures. For example, attempts to use polyethylene terephthalate in the packaging of oxygen sensitive foodstuffs have encountered the main disadvantage that because such resin materials have relatively high permeability to oxygen, the permeation of oxygen into the package or container causes a discoloration and a depreciation in the taste qualities of the packaged foodstuff which is undesirable.

The art has devised a number of methods to reduce the gas premeability of synthetic thermoplastic resins, and included in these methods is the incorporation in the resin of a mineral filler such as mica or glass flake, e.g., U.S. Pat. Nos. 3,463,350 and 4,031,610. Although the incorporation of such fillers in resins such as polyethylene terephthalate does materially increase the gas barrier properties of the resin, the composite material is still deficient in the gas barrier properties required for the packaging of oxygen-sensitive foodstuffs. For example, it has been determined that containers fabricated from thermoplastic resins generally require an oxygen leak rate of about 0.05 cc/100 in$^2$/day @ 73° F. or less in order to be considered for the packaging of oxygen-sensitive foods, i.e., foods such as ham which require a shelf-life of about 18-24 months at ambient, non-refrigerated conditions. Containers fabricated from thermoplastic resins such as polyethylene, polypropylene or polyethylene terephthalate filled with mineral fillers such as mica, generally have an oxygen leak rate in the order of 0.1-0.2 cc/100 in$^2$/day @ 73° F. which is far in excess of the 0.05 cc/100 in$^2$/day @ 73° F. leak rate considered a maximum for food containers. Thus, although the art has attempted to increase the gas barrier properties of thermoplastic resins by using mineral fillers such as mica, the gas barrier requirements for most oxygen-sensitive foodstuffs have still not been effectively met by containers fabricated from these filled resins.

SUMMARY OF THE INVENTION

In accordance with the present invention there is provided a process for the manufacture of mica filled polar thermoplastic resins having improved gas barrier properties wherein a predetermined amount of mica particles having an average particle size of less than about 100 mesh (i.e., will not pass through a 100 mesh screen) or larger than 100 microns are mixed with a molten mass of a polar thermoplastic resin such as a polyalkylene terephthalate resin and a shearing force is applied to the mixture to effect delamination of the platelet layers of the mica.

As will hereinafter be more fully demonstrated, by initially using large or coarse mica particles of less than 100 mesh having a low aspect ratio, i.e., less than about 40, (width/thickness) to prepare the composite resin, an unexpected increase in gas barrier properties is imparted to the polar thermoplastic resin, as well as an improvement in the heat stability. Containers fabricated from a polyethylene terephthalate/mica composite prepared in accordance with the method of the present invention have an oxygen leak rate of less than 0.05 cc/100 in$^2$/day @ 73° F. and are therefore suitable for use in the packaging of oxygen-sensitive foodstuffs which are to be stored at ambient, non-refrigerated temperatures.

DETAILED DESCRIPTION OF THE INVENTION

The high gas barrier composite materials of the present invention are comprised of at least about 20 to 80 weight percent of a polar thermoplastic resin and preferably about 40 to about 60 weight percent of the resin and about 20 to about 80 weight percent mica and preferably about 30 to about 50 percent by weight mica. Included within the meaning of the term "polar thermoplastic resin" are resins such as nylon, polycarbonates, carboxylated polyolefins such as carboxylated polyethylene and carboxylated polypropylene and polyalkylene terephthalate resins such as polyethylene terephthalate, polypropylene terephthalate and polybutylene terephthalate.

Polar polymers are polymers which contain polar groups, namely hydroxyl, carboxyl and/or ester groups. These polar groups are capable of forming adherent covalent bonds with the silanol groups present in the surfaces of the platelets of the mica flakes. It is believed that when a polar thermoplastic resin such as a polyalkylene terephthalate resin is melt blended with the mica flakes, hydroxyl and carboxyl groups are formed by the hydrolysis of the ester linkages at the melt temperature. During mixing, the adhesive, covalent bond strength between the hydrolyzed polyalkylene terephthalate and the silanol containing platelet surfaces of the mica flake become greater than the interplatelet bond strength of the mica flakes whereby the shear forces generated during mixing are transferred to the mica flakes by the viscous resin. As the interplatelet bond strength is less than the bond strength of the resin polar group/silanol covalent bond, cleavage and delamination of the individual platelet layers of the mica will occur. The mica flake platelet layers will either separate at the weakest bonding layer or at the outermost layers due to the shear forces exerted by the viscous, covalently bonded, hydrolyzed resin. As mixing continues, the newly exposed, delaminated, pristine platelet surfaces will further react with the polar groups present in the hydrolyzed resin. The delamination of the mica flakes will be continuous during the melt blending of the polyalkylene terephthalate resin and mica flake whereby the aspect ratio of the original mica flake will dramatically increase as cleavage and delamination of the mica flake laminae continues. This continuous delamination effect obtained with polar thermoplastic resins is not encountered with non-polar resins such as unmodified polyethylene or polypropylene resins as non-polar resins do not normally form any appreciable adhesive covalent bonds with the mica platelet surfaces.

It is critical to the practice of the present invention that large particle size, that is less than 100 mesh more than 100 microns, mica flakes be employed in preparing the polar thermoplastic resin/mica composite to obtain improved gas barrier properties. Regardless of the mixing procedure and mixing devices chosen to prepare the polar thermoplastic resin/mica composite, it has been determined that when coarse sized mica flakes are used to prepare the composite, there is a greater tendency for these flakes to be fractured and crushed into smaller flake particles during the mixing operation. Although the crushing of the coarse mica flakes into smaller particles destroys the original aspect ratio of the flakes there is a greater tendency for the large size particles during melt mixing to delaminate to a greater degree whereby the aspect ratio of the platelet substantially increases resulting in a concomittant increase in gas barrier properties of the mica/polymer mix.

As will hereafter be illustrated, the gas barrier properties of a mica filled polar thermoplastic polymer such as a polyalkylene terephthalate resin are directly influenced by the original particle size of the mica flakes, namely that as the particle size of the mica flakes mixed and blended with the polar thermoplastic resin, increases, the gas barrier properties of the filled resin will also substantially increase.

The mica used in the practice of the present invention is a laminated mineral formed of individual laminae or platelets. To empart maximum gas barrier properties to the polar thermoplastic resin for a given concentration of mica, it is critical to the practice of the present invention that the average mesh size of the mica mixed with the resin be less than about 100 mesh and preferably about 10 to about 60 mesh or about 0.1 to about 10 millimeter diameter.

Mica flakes suitable for use in this invention are commercially available. The mica can be generally characterized as being an aluminum silicate mineral that can be cleaved into thin platelets or sheets. Examples of commercially available mica flakes include those normally denominated as muscovite, biotite and/or phlogopite micas. Mica flakes comprising principally muscovite mica such as K20 (commercial name) are marketed by The English Mica Company and consititute a mica that allows formation of molded polar thermoplastic resin containers with particularly high gas barrier properties.

Although the size of the mica flakes used in the practice of the present invention is critical, the mica should also be selected to give other desired properties such as processability, moldability or improved heat distortion. For good overall performance in polyalkylene terephthalate resin based composites, mica that is retained on a 100 mesh screen, and passed through a 10 mesh screen can be advantageously processed.

In preparing the polar thermoplastic resin/mica composite, the components can be blended and/or compounded by any conventional plastic processing equipment which provides high temperature mixing, such mixing operations being attended by high shear conditions which effect the rapid delamination of the mica flakes, fracture of the flakes being avoided to a degree by a low mixing speed to provide minimum turbulance in preparing the composite. Advantageously, a polyfunctional coupling agent such as a polyepoxide is incorporated in the blend to promote delamination of the mica flakes and impart even greater gas barrier properties and improved heat distortion properties to articles molded from the polar thermoplastic resin/mica blend. The polyfunctional coupling agent is incorporated in the polar thermoplastic resin/mica blend at a concentration ranging from about 0.1 to about 10 percent by weight and preferably about 1 to about 5 percent by weight. Polyepoxides are preferred coupling agents. Numerous suitable polyepoxides are readily available commercially with the aromatic polyepoxides being particularly desirable such as diepoxide resins as Bisphenol A/epichlorohydrine epoxy resins.

In compounding the mica flakes with the polar thermoplastic resin, cleavage to ultimate platelets is accomplished in the plastic processing equipment by heating the polar thermoplastic resin at a temperature at which the resin becomes sufficiently viscous to gain purchase and shear the mica flakes apart advantageously approximating individual platelets with desirably, minimum turbulence, in order to minimize the fracture of the flakes in the direction perpendicular to the cleavage plane.

The polar thermoplastic resin/mica mixing-shearing process used to delaminate the mica is conducted at a temperature at which the resin becomes molten. For example, when mica flakes are to be mixed with polyethylene terephthalate the maximum cleavage of the mica flakes is achieved at temperatures of about 200° C. to about 350° C. and preferably about 250° C. to about 300° C. wherein the resin is sufficiently viscous to mechanically seize and impart the necessary shear forces to the mica flakes to cause delamination thereof, the level of delamination of the flakes being proportional to the gas barrier properties imparted to the polar thermoplastic resin/mica composite.

Plastic processing equipment in which delamination of the mica flakes can be efficiently and effectively accomplished during compounding with a polar thermoplastic resin such as a polyalkylene terephthalate resin include extruders, twin screw extruders and high shear mixers such as the Farrell continuous mixer. Compounding of the mica and polar thermoplastic resin is preferably accomplished in accordance with this invention using compounder-type mixers such as a Buss Cordux mixer or a twin screw extruder which is operated such that the screws are rotating in the same direction. Such twin screw extruders are commercially available with variable screw configurations from Automatic Machinery Corp. In such compounding operations, the melt forming polar thermoplastic resin such as polyalkylene terephthalate resin is added to one end of the twin screw extruder in an area of flight configuration preferably that subjects it to sufficiently high shear to cause an elevated temperature, e.g., 300° C., and to provide a molten mass of resin prior to addition of the mica. By "molten" as the term is used herein is meant with reference to the resin that particles of the resin are at a temperature that can provide their coalescence with one another. Initially, the barrel of the extruder at this area may be heated to maintain its temperature in a range about 300° C., preferably about 270° C. During extended use, however, this area is maintained by conventional means at desired processing temperature, e.g., 250° C.

Advantageously, however, as mentioned, the entire compound extrusion provides a melt residence, i.e., the time that the mica and polar thermoplastic resin exist in melt form, of less than about 2 minutes, more usually less than about 0.5 minute. Although additional melt residence is provided by further molding activities, e.g., injection molding, pellets compounded in the manner described can provide molded articles of excellent gas barrier properties under standard shaping conditions.

Containers may be fabricated from a polar thermoplastic resin/mica composite of the present invention by any conventional plastics molding process such as injection molding thermoforming, press forging or compression molding. These molded containers, exhibit, in addition to improved oxygen barrier properties, unexpected heat stability at elevated temperatures, e.g., 350° F.–500° F., temperatures normally used for baking food products. When heated at these temperatures the containers retain their shape with little or no distortion. The containers also retain their gas barrier properties upon exposure to steam retort conditions used in the sterilization of canned food products.

The following examples are intended to illustrate the invention in currently preferred aspects and should not therefor be interpreted as necessarily limiting the scope thereof for those in the art will recognize other readily apparent modifications within the hereinbefore disclosed invention.

EXAMPLE I

Coarse (20–50 mesh) muscovite mica particles having an average mesh size of 40 at a concentration of 33% by weight were melt blended with 67% by weight polyethylene terephthalate having an intrinsic viscosity of 0.8 dl/gm in a Buss Condux twin screw extruder at 300° F. for 1 minute. Also included in the blend was 5% by weight of an epoxy resin which was a Bisphenol-epichlorohydrin condensate having an average epoxy equivalent of 188 and sold under the trade designation EPON 828 by the Shell Chemical Company. The composite material was extruded into strands which were pelletized into 0.1 inch diameter pellets. The pellets were dried overnight at 125° C. Samples of the PET/mica blended composite were ashed by hydrogen plasma, and the mica particles in the composite were determined by a scanning electron microscope (SEM) examination to have a width of about 200 microns and a thickness of about 0.2 microns or an aspect ratio of 1000.

Cups of the type used for the packaging of margarine were compression molded from pellets of the polyethylene terephthalate/mica composite at a temperature of 200° F.

The oxygen leak rate of the compression molded cups was determined by closing the open end of the cups with a metal end and sealing the end with an epoxy sealant and attaching the closed cup to a Mocon Oxtran 100 instrument. The oxygen leak rate averaged (2 cups) 0.004–0.005 cc $O_2$/100 in$^2$/24 hr./ml. The oxygen leak rate of containers for oxygen sensitive foodstuffs requires an oxygen leak rate below 0.05 cc $O_2$/100 in$^2$/24 hr./ml as measured by the aforementioned instrument. The cups were subjected to steam retort conditions (i.e., steam at 250° F. and 30 psi pressure) without any diminution in gas barrier properties.

Trays were compression molded from pellets of the polyethylene terephthalate/mica composite at a temperature of 250° C. The trays were placed in an oven heated to 500° F. for 30 minutes. Little or no distortion of the trays was noted after removal of the trays from the oven.

EXAMPLE II

Coarse (10–100 mesh) muscovite mica particles having an aspect ratio of 5–15 (100 to 900 microns wide and 7 to 180 microns thick) at a concentration of 30% by weight were melt blended with 70% by weight polyethylene terephthalate having an intrinsic viscosity of 0.8 dl/gm in a Farrel continuous mixer at 200° C. for 1 minute and extruded into strands which were pelletized into 0.1 inch diameter pellets. The pellets were dried overnight in an oven at 125° C. Samples of the polyethylene terephthalate/mica composite were ashed by hydrogen plasma, and the mica particles in the composite were determined by SEM examination to have a width of 500 to 1500 microns and a thickness of 1 to 100 microns or an aspect ratio of 15–500.

Dish shaped containers were injection forged from pellets of the PET/mica composite at a temperature of 250° C. The oxygen leak rate of the containers was determined to be 0.038 cc $O_2$/100 in$^2$/24 hr./ml at 73° F.

For purposes of comparison, the procedure of Example II was repeated with the exception that fine (325 mesh) muscovite particles 30 to 60 microns wide and 0.5 to 2.0 microns thick (aspect ratio 30–60) were substituted for the mica particles used in Example II. Mica particles present in samples of this comparative melt blended PET/mica composite, when ashed by hydrogen plasma were determined by SEM examination to have a width of 12 to 30 microns and a thickness of 0.4 to 3.0 microns or an aspect ratio of 10–30.

Dish shaped containers were injection forged from pellets of the PET/mica composite at a temperature of 250° C. The oxygen leak of the containers was determined to be 0.159 cc $O_2$/100 in$^2$/24 hr. @ 73° F., which leak rate is considered unacceptable for the packaging of oxygen-sensitive foodstuffs.

EXAMPLE III

The procedure of Example II was repeated with a Buss Cordux blender used for blending the PET/mica composite. After compounding, the aspect ratio of the mica particles in the blended PET/mica composite was determined by SEM examination to be 100 to greater than 1000.

Containers injection forged from the PET/mica composite were determined to have oxygen leak rates averaging 0.005 cc $O_2$/100 in$^2$/24 hr/ml @ 73° F.

For purposes of comparison, the procedure of Example III was repeated with the exception that fine (325 mesh) muscovite particles 30 to 60 microns wide and 0.5 to 2.0 microns thick (aspect ratio: 30–60) were substituted for the mica particles used in Example III. Mica particles present in samples of this comparative PET/mica composite were determined by SEM examination to have a width of 20 to 40 microns and a thickness of 0.2 to 2.0 microns or an aspect ratio of 20–100.

Containers injection forged from the comparative PET/mica composite were determined to have oxygen leak rates averaging 0.035 cc $O_2$/100 in$^2$/24 hr/ml @ 73° F., which leak rate is considered marginal for packaging of oxygen-sensitive foodstuffs.

What is claimed is:

1. A method of preparing a polar thermoplastic resin having increased resistance to gas permeability which comprises providing a blend of the resin and mica flakes having a plurality of platelets, the flakes having a particle size less than about 100 mesh before blending and then admixing the mica flakes and resin at a temperature at which the resin is molten, the admixing imparting a shear force which effects delamination of the mica platelets and a substantial increase in the aspect ratio whereby improved gas barrier and heat stability properties are achieved.

2. The method of claim 1 wherein the polar thermoplastic resin is a polyalkylene terephthalate.

3. The method of claim 2 wherein the polyalkylene terephthalate is polyethylene terephthalate.

4. The method of claim 1 wherein the average particle size of the mica flakes blended with the polyalkylene terephthalate is about 10 to about 100 mesh.

5. The method of claim 1 wherein the aspect ratio of the mica flakes before blending is less than about 40.

6. The method of claim 1 wherein the blend mixture is comprised of about 20 to about 80 percent by weight of the polar thermoplastic resin and about 20 to about 80 percent by weight of the mica flakes.

7. The method of claim 6 wherein a polyepoxide is added to the blend at a concentration of from about 0.1 to about 10 percent by weight.

8. The method of claim 7 wherein the polyepoxide is the condensate of Bisphenol A and epichlorohydrin.

9. The method of claim 1 wherein the admixing is performed at a temperature of about 200° C. to about 350° C.

10. The composition comprised of a blend of a polar polymer and mica prepared by the method of claim 1.

11. The composition of claim 10 wherein the polar thermoplastic resin is a polyalkylene terephthalate.

12. The composition of claim 11 wherein the polyalkylene terephthalate is polyethylene terephthalate.

13. The composition of claim 10 wherein the blend mixture is comprised of about 20 to about 80 percent by weight of the polar thermoplastic resin and about 20 to about 80 percent by weight of the mica flakes.

14. The composition of claim 13 wherein a polyepoxide is added to the blend at a concentration of from about 0.1 to about 10 percent by weight.

15. The composition of 14 wherein the polyepoxide is the condensate of Bisphenol A and epichlorohydrin.

16. A method of forming a thermoplastic container having increased gas barrier and heat stability properties and adapted to be used for the packaging of foodstuffs highly susceptible to oxidative deterioration which comprises providing a blend of a polar thermoplastic resin and mica flakes having a plurality of platelets, the flakes having an average particle size less than about 100 mesh, admixing the mica flakes and polar thermoplastic resin at a temperature at which the resin is molten, the admixing imparting a shear force which effects delamination of the mica platelets to effect a substantial increase in the aspect ratio of the flakes with a concommitant increase in the gas barrier properties of the resin, and then molding the admixture into a container.

17. The method of claim 16 wherein the resin is a polyalkylene terephthalate.

18. The method of claim 17 wherein the polyalkylene terephthalate resin is polyethylene terephthalate.

19. The method of claim 16 wherein the aspect ratio of the mica flakes blended with the polyalkylene terephthalate has an aspect ratio of less than about 40.

20. The method of claim 16 wherein the blend mixture is comprised of about 20 to about 80 percent by weight of the polyalkylene terephthalate resin and about 15 to about 75 percent by weight of the mica flakes and about 0.5 to about 10 percent by weight of an epoxy resin.

21. The method of claim 16 wherein the mica flakes added to the blend have a particle size ranging from about 10 to about 60 mesh.

22. The method of claim 16 wherein the admixing is performed at a temperature of about 200° C. to about 300° C.

23. The method of claim 16 wherein the admixture is molded into a container by compression molding.

24. The method of claim 16 wherein the admixture is molded into a container by injection molding.

25. The method of claim 16 wherein the admixture is molded into a container by thermoforming.

26. A container manufactured by the method of claim 16.

27. A container manufactured by the method of claim 20.

* * * * *